July 25, 1967          J. A. VANDERJAGT          3,332,296
MECHANICAL DRIVE MECHANISM USING CIRCULATING ELEMENTS
Filed Oct. 23, 1965          6 Sheets-Sheet 1
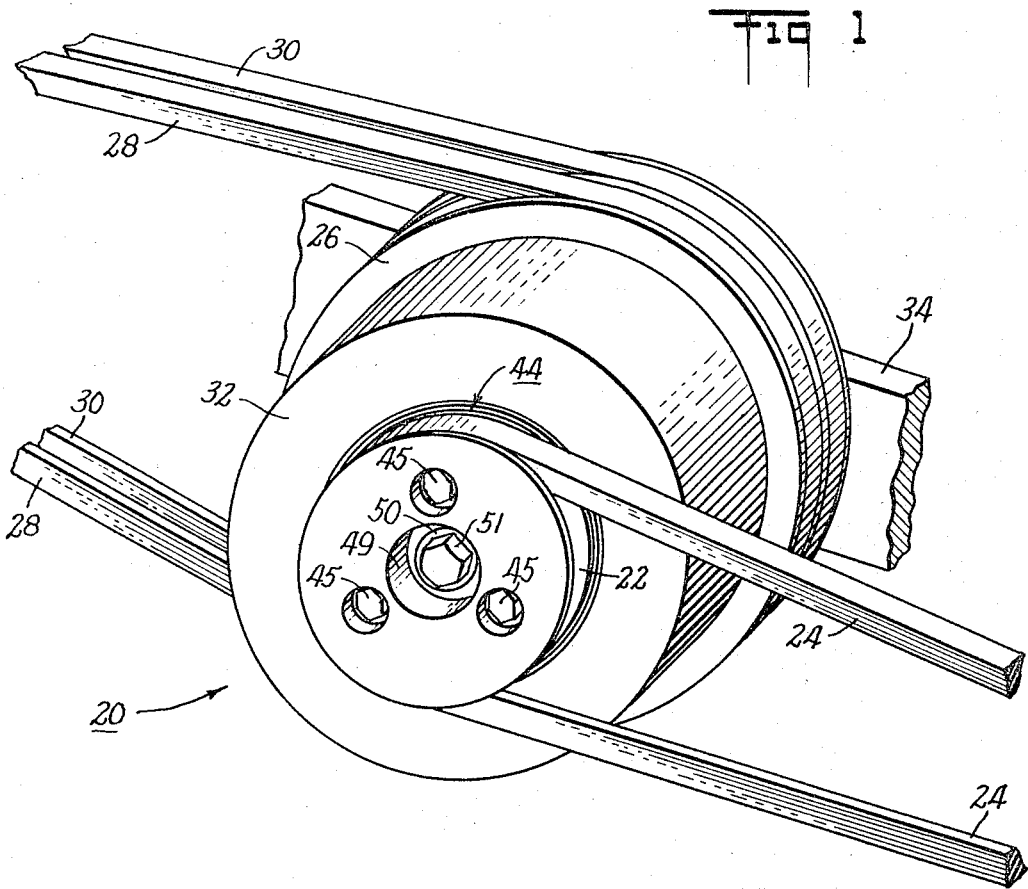
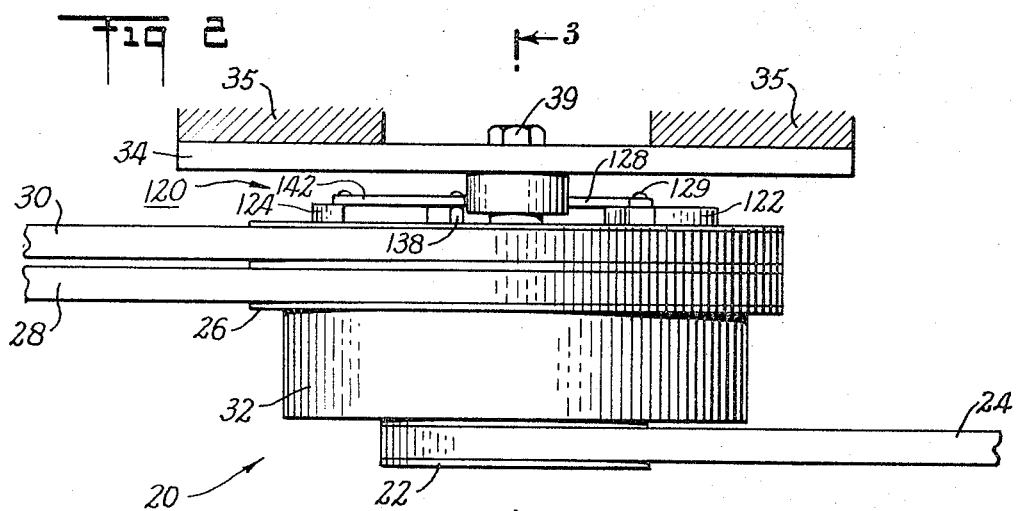
INVENTOR
John A. Vanderjagt
BY
Blair, Buckles + Cesari
ATTORNEYS

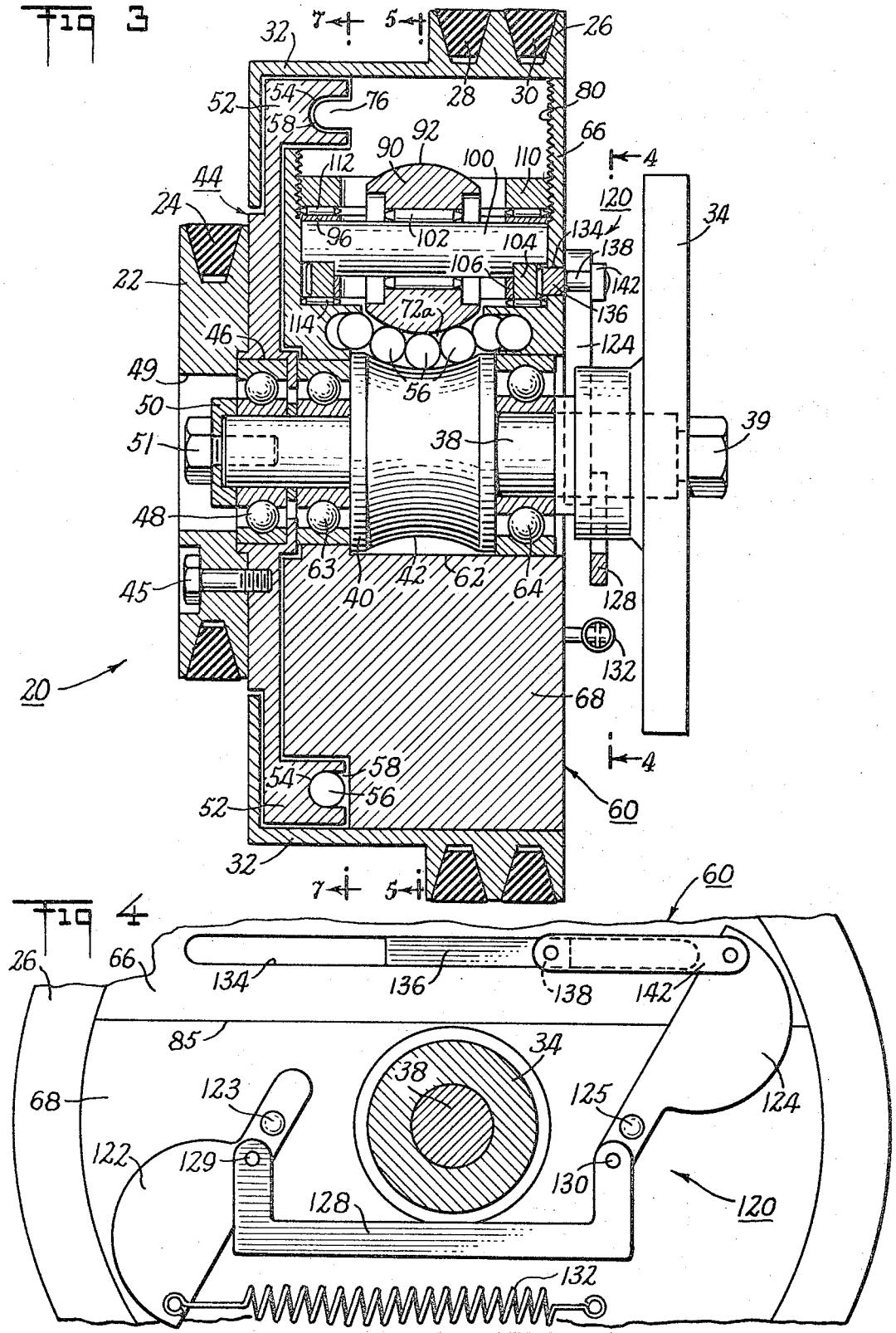

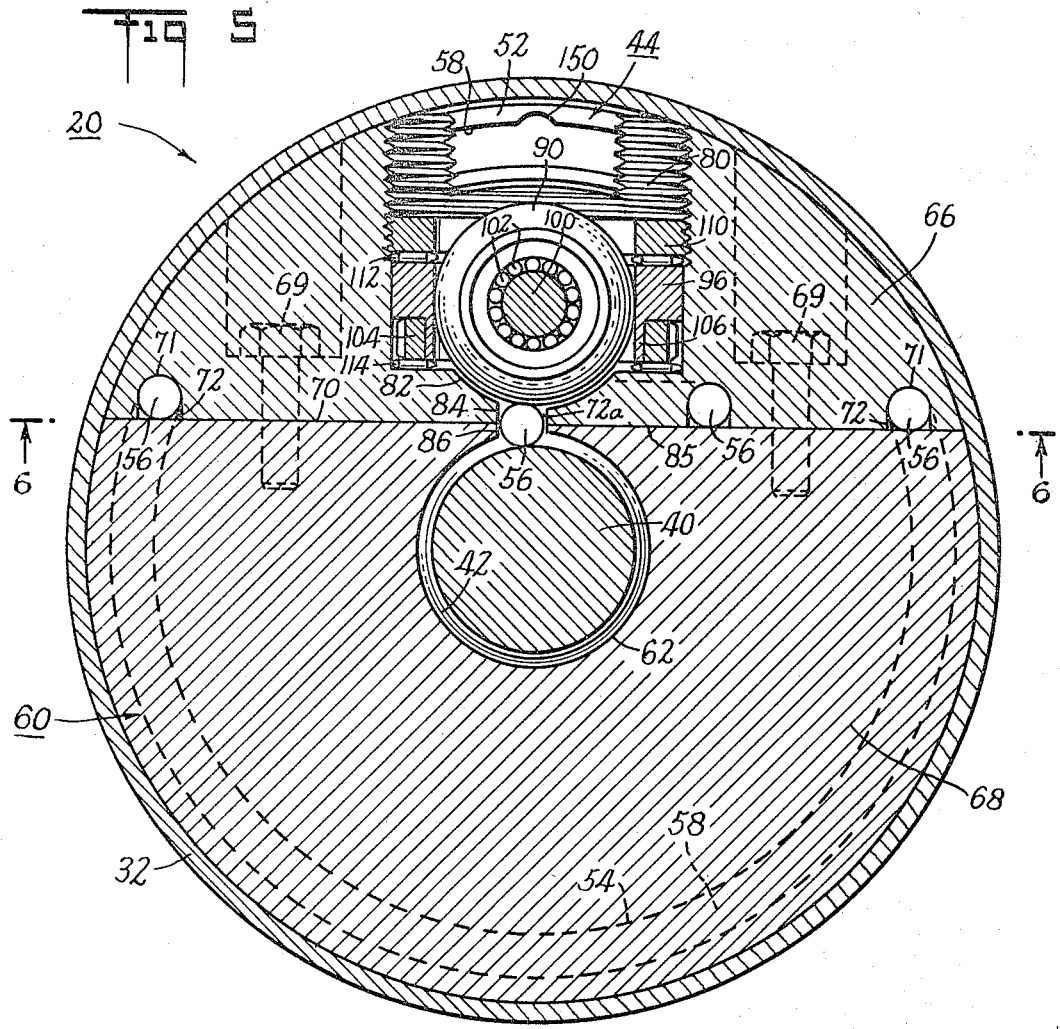
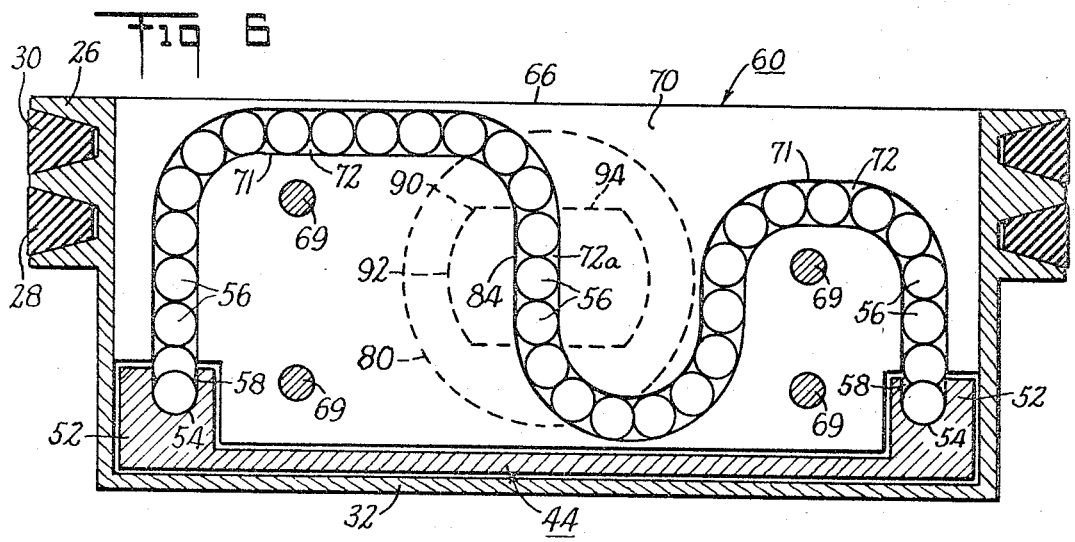

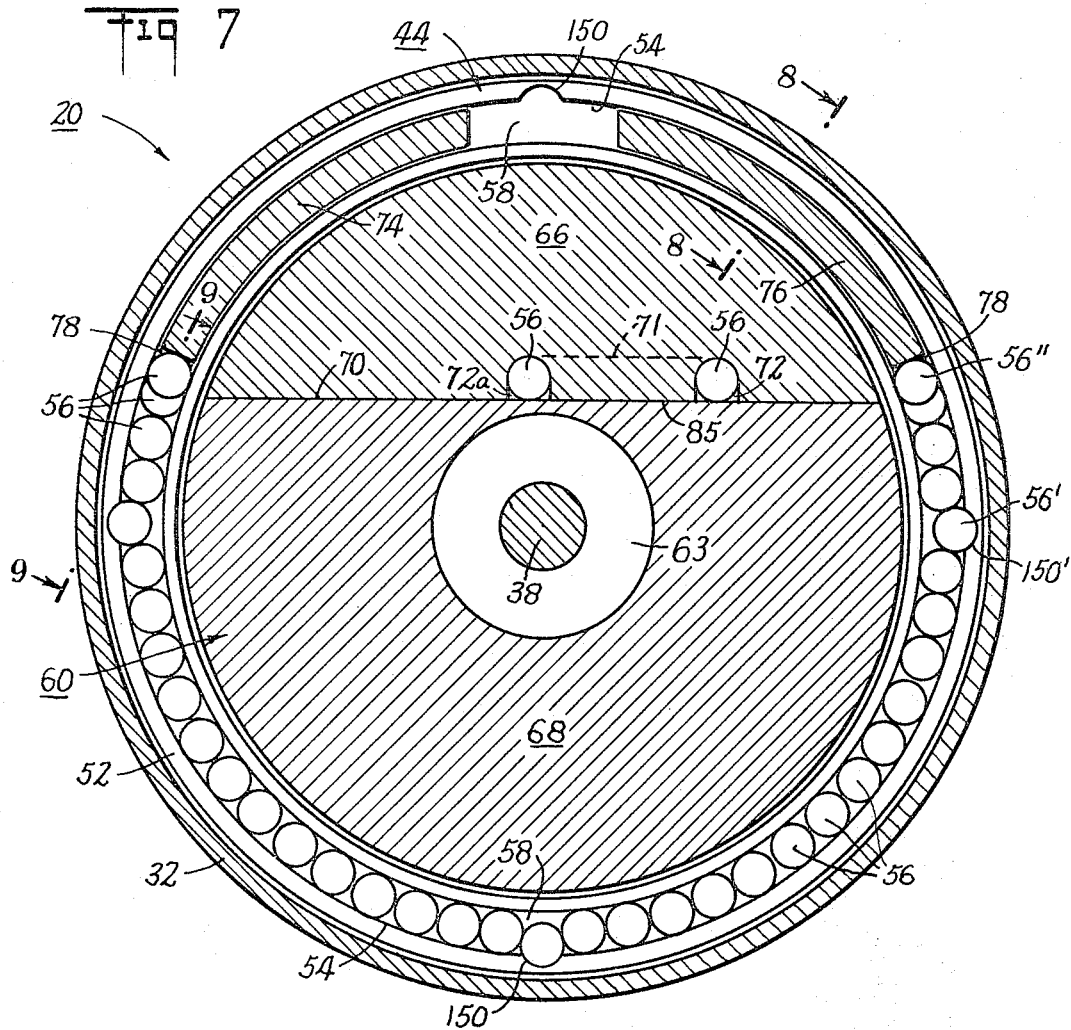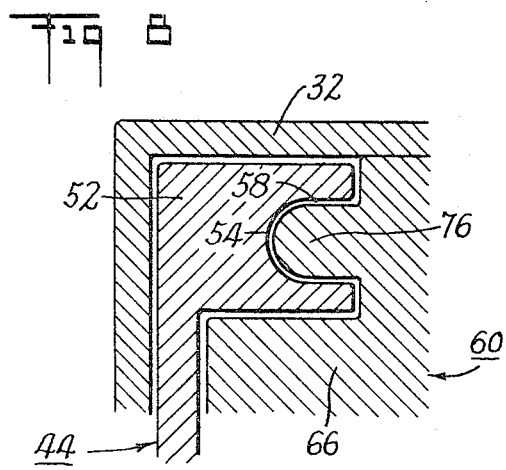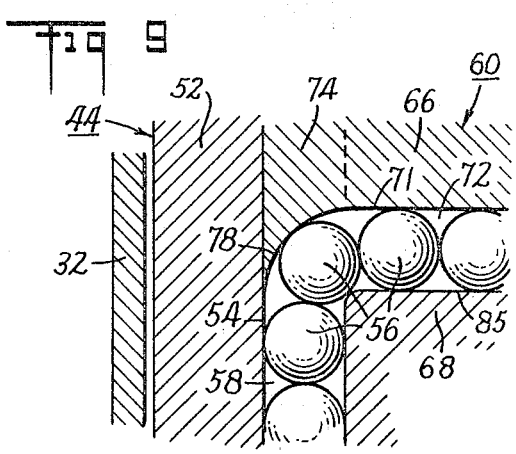

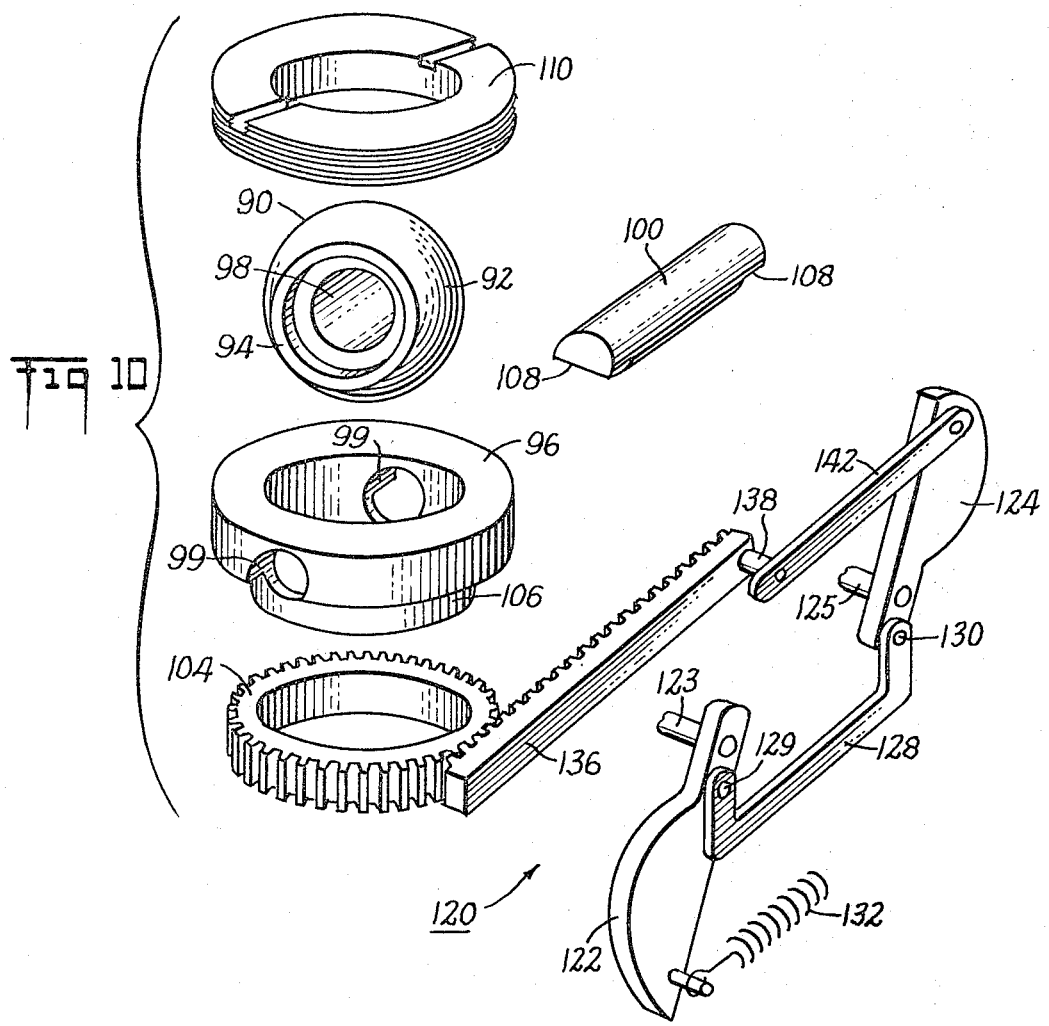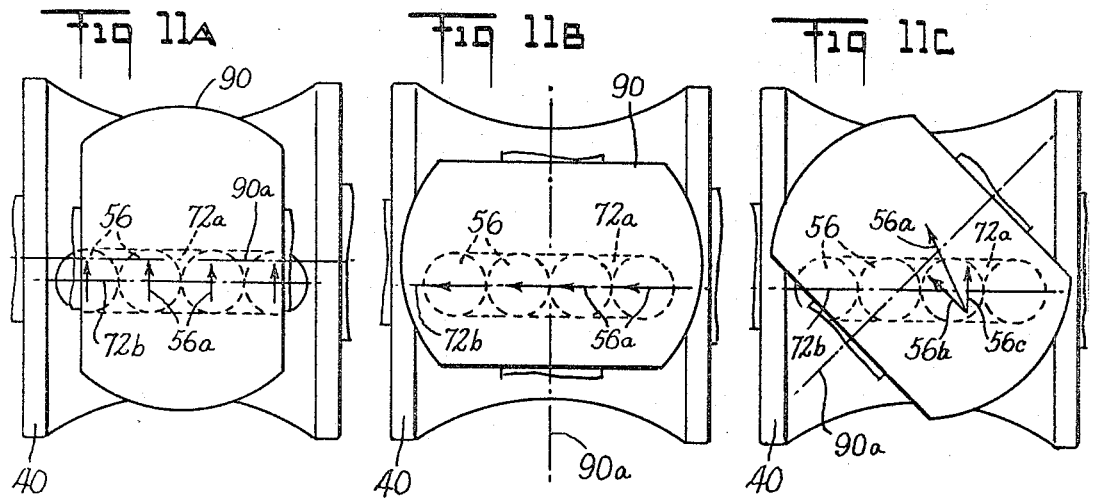

United States Patent Office 3,332,296
Patented July 25, 1967

3,332,296
MECHANICAL DRIVE MECHANISM USING
CIRCULATING ELEMENTS
John A. Vanderjagt, Memphis, Tenn., assignor to
Pitts Industries, Inc., Memphis, Tenn.
Filed Oct. 23, 1965, Ser. No. 503,637
33 Claims. (Cl. 74—216.3)

The present invention relates to a continuously variable mechanical drive mechanism. More particularly, it relates to a mechanical drive mechanism employing an endless series of circulating balls to transfer motion and power from a drive member to a driven member. Control means is provided to regulate the rate of circulation of the balls so as to establish desired drive characteristics between the drive and driven members. Moreover, the control means is readily adjustable so as to provide for infinite variability of the drive characteristics established between the drive and driven members.

There are a wide variety of constant and variable speed drives, including transmissions, presently available. Some types of available constant and variable speed drives employ drive and driven members which can be, in effect, varied in size and thereby vary the speed ratio therebetween. Such types may employ pulleys as the drive and driven members. The pulleys engage a belt to transmit drive from one to the other. If the effective diameters of the pulleys are varied, the speed ratio therebetween also varies. Another type of mechanical drive mechanism, adapted as either a constant or a variable speed drive, employs a pair of plates with a ball interposed between and engaging the flat faces of the plates. The plates are journaled for rotation about their centers. Variation in the speed ratio between the two plates is achieved by adjusting the alignment of the centers of the plates and the location of the ball relative to the centers of each plate. Still another form of drive mechanism utilizes means for effecting intermittent engagement between the drive and driven members. The frequency of this intermittent engagement establishes the speed ratio between the drive and driven members. The above-noted types of mechanical drive mechanisms can and have been adapted to provide infinite variability of the speed ratio established between the drive and driven members.

Currently available constant and variable speed drive mechanisms, including those specifically noted above, having an infinitely variable speed ratio feature all have manifold drawbacks. Most are not reversible unless, of course, the direction of motion of the drive member is reversed. Many cannot provide an idle condition without using some form of clutching mechanism. Others are severely limited in the amount of power they can handle. Most are quite costly. Such drive mechanisms are typically quite complex, require a considerable number of parts, are bulky in size, and have a low torque to weight ratio.

The various types of available transmissions typically do not provide for infinite variability of the speed ratio between the drive and driven members. The speed ratio can only be varied in steps such as by the changing of gear ratios, etc., either manually or automatically. During the process of "shifting" gears all control over the speed ratio is lost and the output speed may increase or decrease drastically. Since the speed ratio cannot be adjusted gradually, the output speed will change abruptly as a new speed ratio between the drive and driven members is established. Moreover, transmissions typically require a clutching mechanism in order to establish an idle condition and, in some types, to permit the shifting from one speed ratio to another. Transmissions are relatively expensive and complex, requiring a large number of parts. Those designed to handle reasonable amounts of power are bulky and heavy in weight.

Accordingly, it is an object of my invention to provide a mechanical drive mechanism which is readily adjustable to establish a desired speed ratio between drive and driven parts.

An additional object is to provide a drive mechanism of the above character which is infinitely adjustable to establish any desired speed ratio within a given range.

A further object is to provide a drive mechanism of the above character wherein variations in the speed ratio can be accomplished smoothly and, if desired, gradually.

Another object is to provide a drive mechanism of the above character which is capable of establishing an idle condition between drive and driven parts without requiring a clutching type mechanism.

Still another object is to provide a drive mechanism of the above character which is capable of handling large amounts of power.

Yet another object is to provide a drive mechanism of the above character which is simple in design, compact, and requires few parts.

A further object is to provide a mechanical drive mechanism of the above character which can be manufactured inexpensively.

Another object is to provide a drive mechanism of the above character adapted to automatically maintain the speed of the driven part constant.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIGURE 1 is a perspective view of a mechanical drive mechanism constructed according to my invention;

FIGURE 2 is a top plan view of the drive mechanism of FIGURE 1;

FIGURE 3 is a cross-sectional view taken along line 3—3 of FIGURE 2;

FIGURE 4 is a partial side elevational view taken along line 4—4 of FIGURE 3;

FIGURE 5 is a cross-sectional view taken along line 5—5 of FIGURE 3;

FIGURE 6 is a sectional view taken along line 6—6 of FIGURE 5;

FIGURE 7 is a cross-sectional view taken along line 7—7 of FIGURE 3;

FIGURE 8 is a fragmentary cross-sectional view taken along line 8—8 of FIGURE 7;

FIGURE 9 is a fragmentary cross-sectional view taken along line 9—9 of FIGURE 7;

FIGURE 10 is an exploded perspective view of the control ball assembly seen in FIGURES 3 and 5, and a perspective view of the governor assembly seen in FIGURE 4 which operates on the control ball assembly;

FIGURES 11A through 11C are diagrammatic illustrations of various orientations of the control ball assembly such as seen looking down from the top of FIGURES 3 and 5;

Corresponding reference numerals refer to corresponding parts throughout the several views of the drawings.

GENERAL DESCRIPTION

Figure 12:
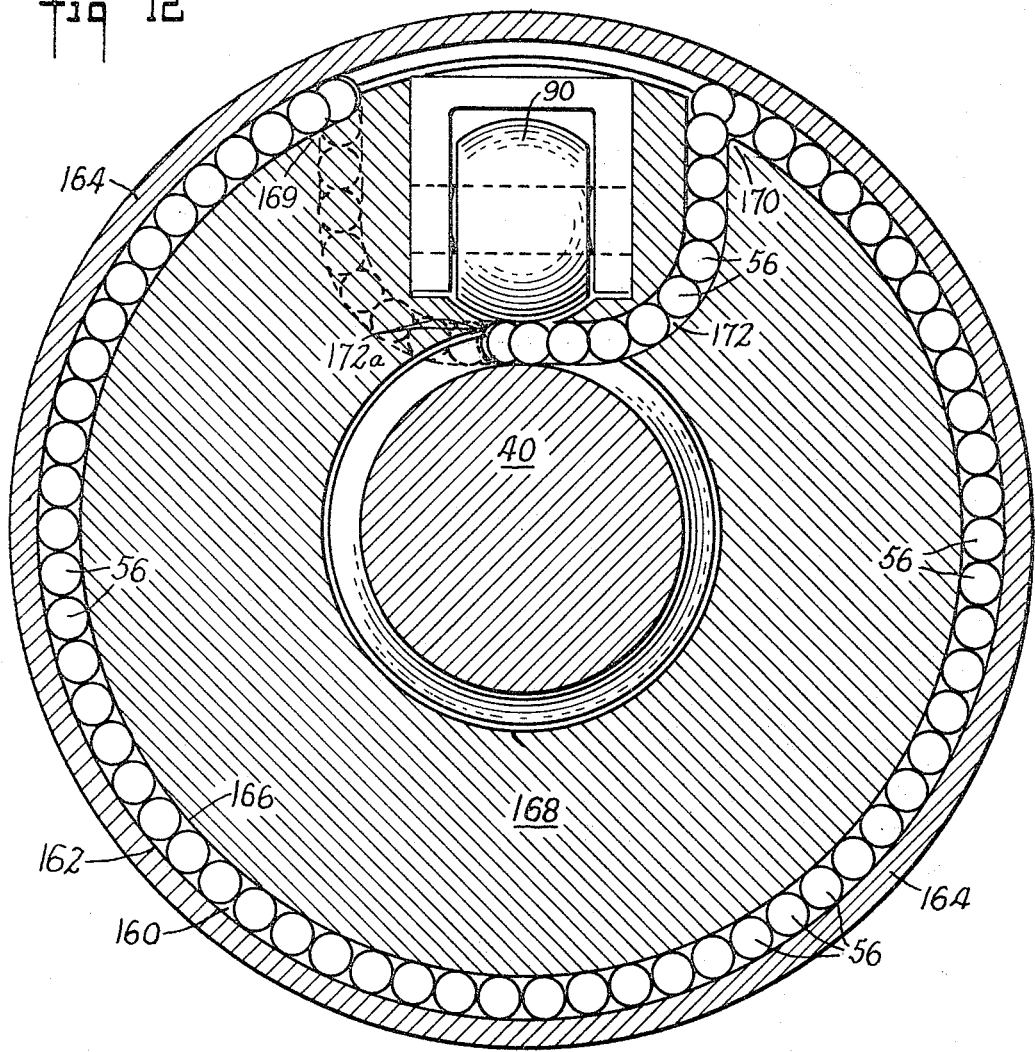
FIGURE 12 is a cross-sectional view of a modified mechanical drive mechanism constructed according to my invention.

Broadly stated, the mechanical drive mechanism constructed according to my invention comprises a rotary drive member drivingly connected to a suitable power source and a rotary driven member drivingly connected to a utilization device. A closed-loop channel formed in portions of the drive member and the driven member accommodates a plurality of serially arranged drive balls. The drive balls are urged into circulatory movement through at least a portion of the channel by rotation of the drive member. Driving force developed by the drive member is selectively transmitted to the driven member by way of the drive balls.

Control means positioned in communication with a section of the channel is selectively operated so as to determine the rate of travel of the drive balls therethrough. The control means includes a control ball which is mounted in the driven member for rotation about a first axis and for angular orientation about a second axis normal to the first axis. The control means further includes a spool fixedly mounted against rotation and disposed in a central bore in the driven member.

The drive balls in the section of the channel communicating with the control means are coacted upon by the control ball and the spool to impart a spin thereto. The direction of spin of these drive balls relative to the longitudinal direction of this section of the channel is controlled by the angular orientation of the control ball about the second axis. The direction of spin of the drive balls determines the rate at which the drive balls will successively roll through this section of the channel, and thus, the rate of drive ball circulation therethrough. The rate of circulation of the drive balls through this channel section is inversely proportional to the speed ratio (turn ratio) established between the drive member and the driven member.

In one embodiment of my invention, ball receiving notches are formed in a first portion of the channel which is carried by the drive member. The remainder or second portion of the channel is formed in and carried by the driven member. A pair of projections also carried by the driven member guide the drive balls into and out of the portions of the channel carried by the drive member and by the driven member. As the drive member is rotated, at least one drive ball will lodge in a notch in the first channel portion. Thus the drive balls in the first channel portion revolve at the same rate as the drive member is rotated.

If the control ball is oriented about the second axis such that the drive balls may roll through the second channel portion communicating with the control means at the same rate they are being revolved by rotation of the drive member, substantially no force tending to rotate the driven member is transmitted from the drive member. Thus, the drive balls circulate through the second channel portion at a maximum rate and the speed ratio between the drive and driven members is 1:0.

On the other hand, if the control ball is oriented such that the drive balls roll through the second channel portion at a rate less than the rate at which they are revolved by the drive member while in the first channel portion, driving force is transmitted from the drive member to the driven member. A speed ratio between 1:1 and 1:0 is achieved between the drive member and the driven member.

Finally, if the control ball is oriented such that drive balls are prevented from rolling through the second channel portion, a one to one speed ratio between the drive member and the driven member is achieved.

In the situations where driving force is transmitted from the drive member to the driven member, the driving connection therebetween is constituted by the series of drive balls disposed between the one lodged in the notch in the first channel portion and the one engaging the projection guiding the drive balls into the second channel portion carried by the driven member.

The control means can be adjusted by establishing the appropriate angular orientation of the control ball about the second axis so as to readily achieve any desired speed ratio from 1:1 to 1:0 between the drive member and the driven member.

In another embodiment of my invention, a first portion of the channel is bounded by contiguous surfaces of the drive and driven members. The drive balls in this first channel portion are in constant contact with both the drive and driven members. The second portion of the channel is formed in and carried by the driven member. The drive balls travel through this second channel portion to be acted upon by the control means which includes the control ball and the spool as described above. No ball receiving notches are formed in the first channel portion.

As the drive member is rotated, the drive balls are circulated at a rate determined by the angular orientation of the control ball about the second axis. If the control ball is oriented such that the drive balls cannot pass through the first channel portion, the drive balls do not roll in the first channel portion. Consequently a 1:1 speed ratio is achieved with the driving force being transmitted from the drive member to the driven member through the individual drive balls in the first channel portion. If the control ball is oriented such that the drive balls may pass through the second channel portion, the drive balls in the first channel portion roll between the contiguous surfaces of the drive and driven members. The rate at which these drive balls roll is determined by the rate of circulation of the drive balls through the second channel portion. As the drive balls in the first channel portion roll, the driven member loses pace with the drive member thus producing a speed ratio of less than 1:1. When the control ball of the control means is oriented such that the drive balls pass through the second channel portion at a rate equal to the rate at which they roll through the first channel portion, a 1:0 speed ratio is achieved.

DETAILED DESCRIPTION

Referring now to the drawings, a mechanical drive mechanism constructed according to one embodiment of my invention is indicated generally at 20 in FIGURES 1 and 2. A drive pulley 22 is drivingly connected to a power source (not shown) by a belt 24. An output pulley, generally indicated at 26, is shown having double grooves for accommodating separate belts 28 and 30. The belts 28 and 30 drivingly connect the drive mechanism 20 to a single utilization device (not shown) or separate ones, as desired. The output pulley 26 is carried by an annular shroud 32 of L-shaped cross-sectional configurations. The shroud 32 serves to close off the interior of the drive mechanism 20 and thereby prevent the entrance of dust, dirt and like contaminates.

As best seen in FIGURE 2, a support plate 34 fixedly secured to a stationary mounting, diagrammatically indicated at 35, serves the purpose of mounting the drive mechanism 20 in operable position. The support plate 34 is fixedly mounted on a central shaft 38 about which the various parts of the drive mechanism 20 rotate.

Referring now to FIGURE 3, it is seen that the support plate 34 is affixed to the central shaft 38 by means of a bolt 39. A spool 40, circular in cross-section, is fixedly mounted to the shaft 38 intermediate its ends. The outer peripheral surface 42 of the spool 40 is formed with a concave surface configuration in longitudinal cross-section.

The drive pulley 22 is attached to a drive member, generally indicated at 44, by means of screws 45 (FIGURES 1 and 3). A central opening 46 in the drive member 44 is fitted with a bearing 48 to journal the drive member for rotation about the central shaft 38. The free end of shaft 38, accessible through a central opening 49 in the drive pulley 22, is fitted with an end cap 50 held in place by means of a bolt 51. The end cap 50 serves to prevent the bearing 48 from slipping off the free end of the shaft 38.

Still referring to FIGURE 3, the drive member 44 is integrally formed with a longitudinally extending annular flange 52 adjacent its outer edge. An annular groove 54 is cut in the face of the flange 52 to provide a channel 58 for accommodating a plurality of drive balls 56. The channel 58 is best seen in FIGURE 7.

A driven member, generally indicated at 60 in FIGURE 3, is provided with a central bore 62 accommodating the central shaft 38 and spool 40. The driven member 60 is journalled for rotation about the central shaft 38 by bearings 63 and 64 positioned on opposite sides of the spool 40.

As best seen in FIGURES 5 and 7, the driven member 60 is formed in two parts, an upper part 66 and a lower part 68 fastened together by means of bolts 69.

Referring now to FIGURE 6, the undersurface 70 of the part 66, faced against the upper surface of the lower portion 68, is formed with a surface groove 71 providing a channel 72 for routing the drive balls 56 to and from the annular channel 58 in the drive member 44. It is seen that when the two parts 66 and 68 of the driven member 60 are bolted together and assembled on the central shaft 38 together with the drive member 44, the grooves 54 and 71 become closed channels 58 and 72 which together form a single closed-loop channel accommodating the drive balls 56 in their circulatory movement.

To guide the drive balls 56 into and out of the channels 58 and 72, a pair of arcuate projections 74 and 76 are formed integrally with the upper part 66 of the driven member 60, as best seen in FIGURES 7 through 9. These arcuate projections 74 and 76 are conformed so as to be freely received in the annular groove 54 formed in the drive member 44. As best seen in FIGURE 9, the lower extremities of the projections 74 and 76 are formed with arcuate surface portions 78 effective to smoothly divert the drive balls 56 to and from the channels 58 and 72. It will thus be seen, that the drive balls 56 are confined to the lower portion of the annular groove 54 between the lower extremities of the projections 74 and 76 as seen in FIGURE 7.

Referring now to FIGURE 5, the part 66 of the drive member 60 is formed with a circular well 80. Centrally located in the bottom surface of the well 80 is a spherically contoured recess 82. A slot 84 is cut through the bottom of the recess 82 to the interface 85 between the part 66 and the part 68 of the driven member 60. Slot 84 communicates with a corresponding slot 86 cut in the part 68 of the driven member 60.

Referring jointly to FIGURES 5 and 6, the slots 84 and 86 form the side walls for a portion 72a of the channel 72 machined in the bottom surface 70 of the part 66. Inasmuch as the slot 86 in the part 68 is cut through to the central bore 62, the bottom surface of the channel portion 72a is provided by the concave surface portion 42 of the spool 40. As seen in FIGURE 3, the channel portion 72a is parallel to the central shaft 38.

Referring now to FIGURE 10, a control ball, generally indicated at 90, is provided with a spherically contoured working surface 92 and flattened end surfaces 94. The control ball 90 is inserted in a mounting ring 96 with the central bore 98 of the control ball aligned with through-holes 99 in the mounting ring. A shaft 100 is inserted through holes 99 and the central bore 98 of the control ball 90. Bearings 102, seen in FIGURE 3, journal the control ball 90 for rotation about the shaft 100. A ring gear 104 is force fitted on an integrally formed bottom sleeve portion 106 of the mounting ring 96. The ring gear 104 engages shoulders 108 cut in each end of the shaft 100 to hold the control ball assembly together.

Referring now to FIGURES 3 and 5, the control ball assembly, described in connection with FIGURE 10, is dropped into the well 80 formed in the part 66 of the drive member 60. An annular lock nut 110 engaging the threaded side wall of the well 80 is screwed down on the control ball assembly to hold it in place. Upper bearings 112 and lower bearings 114 journal the control ball assembly so as to be freely rotatable in well 80 about an axis perpendicular to the axis of the shaft 100. With the control ball assembly so mounted in the part 66 of the driven member 60, the spherical working surface 92 of the control ball 90 provides the upper boundary, seen in FIGURES 3 and 5, for the portion 72a of the channel 72. When the control ball 90 is properly mounted in the part 66, the surface 92 is closely spaced from the surface of recess 82 so as not to interfere with the rotation of the control ball.

It is seen from FIGURES 5 and 6, that the major portion of the channel 72 accommodating the drive balls as they move through the driven member 60 is defined by the groove 71 formed in the bottom surface 70 of the part 66 and the upper surface of the part 68. The portion 72a of this channel 72 is defined by the slots 84 and 86 in the parts 66 and 68, the spherical surface 92 of the control ball 90 and the concave surface 42 of the central spool 40. The concave surface 42 of the spool 40 geometrically complements the spherical working surface 92 of the control ball 90 such that the portion 72a of the channel 72 is uniform throughout, and, depending upon the orientation of the control ball 90 as described below, will admit the passage of drive balls 56 therethrough.

In the disclosed embodiment of my invention, the mechanical drive mechanism 20 is adapted as a constant speed drive in that the driven member 60 to which the output pulley 26 is rigidly affixed by suitable means rotates at a constant speed in spite of speed variations in the drive pulley 22. As is described below, variations in the speed ratio between the drive member 44 and the driven member 60 in order to achieve the constant speed output is produced by selectively orienting the spin axis (shaft 100) of the control ball 90 relative to the portion 72a of the channel 72 (FIGURE 5). To provide this angular orientation of the control ball 90, a governor, generally indicated at 120 in FIGURES 4 and 10, is employed.

Referring jointly to FIGURES 4 and 10, the governor 120 consists of a pair of weights 122 and 124 pivotally mounted to the side surface of the bottom part 68 by pins 123 and 125. The weights 122 and 124 are connected together by a link 128. Connecting link 128 is pivotally connected to weight 122 by a pin 129 and to weight 124 by a pin 130 such that movements of the weights about their respective pivot points 123 and 125 are maintained uniform. The tendency of the weights 122 and 124 to swing out upon rotation of the driven member 60 is resisted by a calibrated spring 132 attached to one end of the weight 122 and at the other to the part 68.

Referring momentarily to FIGURE 3, an elongated groove 134 is cut in the side of the part 66 for accommodating a rack gear 136 best seen in FIGURE 10. The groove 134 is of sufficient length to accommodate reciprocal movement of the rack gear 136. A middle portion of the groove 134 opens into the well 80 formed in part 66.

The teeth of the rack gear 136 engage the teeth of the ring gear 104 affixed to the mounting ring 96 for the control ball 90 (FIGURE 10). As best seen in FIGURES 3 and 4, a pin 138 is affixed to the rack gear 136. The outer end of the pin 138 is pivotally connected to a one end of a link 142. The other end of the link 142 is pivotally connected to the weight 124. It will thus be seen that pivotal movement of the weights 122 and 124 about their respective pivot points 123 and 125 is translated into rotation of the control ball assembly about the axis of the mounting ring 96; this axis being perpendicular to the axis of the shaft 100 rotatably mounting the control ball 90.

Referring now to FIGURE 7, the radially outer wall of the annular groove 54 in the drive member 44 is formed with four equally spaced notches 150. When the drive member 44 is rotated, the resulting centrifugal force will cause a drive ball 56 to lodge in at least two of the notches 150. It will be appreciated that at least one and sometimes two of the notches 150, depending upon the angular orientation of the drive member 44 during rotation, will lie in a sector of the groove 54 where drive balls are precluded by virtue of the diverting action of the projections 74 and 76. The drive balls on either side of the ones lodged in the notches 150 effectively achieve a wedging action to positively hold the drive balls in the notches 150.

Assume that the drive member 44 is rotated in the counterclockwise direction as seen in FIGURE 7. It will be seen that the drive balls 56 in channel 58 revolve in the counterclockwise direction about the shaft 38. If the drive balls are prevented from passing through channel 72 in the driven member 60, there is an unvarying mechanical connection between the drive and driven members. Consequently, a 1:1 speed ratio between the drive member 44 and the driven member 60 is achieved. This unvarying mechanical connection between the drive member and the driven member is seen in FIGURE 6 to be constituted by the series of drive balls 56 in channel 58 disposed between the one 56' lodged in notch 150' and the one 56" which continuously engages the arcuate surface 78 (FIGURE 8) carried at the lower extremity of the projection 76. Thus driving force is transmitted in positive fashion from the drive member 44 and the driven member 60.

Still referring to FIGURE 7, if the drive balls 56 are permitted to circulate through channel 72 in the driven member 60 at a rate equal to the rate they are revolved by the drive member 44, no driving force is communicated to the driven member 60, and the speed ratio is 1:0 (idle). Thus, the drive balls are being taken from one end of channel 58 by the projection 76 and reintroduced into the other end of the channel 58 by the projection 74 as fast as the drive balls in channel 58 are moved around toward projection 76 by rotation of the drive member 44. In effect, the mechanical connection between the drive member 44 and the driven member 60 contituted by the drive balls 56 is yielding at the same rate as the drive member is rotated. As a consequence, substantially no force is transmitted from the drive member 44 to the driven member 60, aad the latter remains stationary.

When the drive balls 56 are circulated through channel 72 at a rate less than at idle, it is seen that the drive balls are not taken from the channel 58 by the projection 76 and introduced back into the channel 58 by the projection 74 as fast as the drive balls in channel 58 are brought around by the rotation of drive member 44. Consequently, the mechanical connection between the drive member 44 and the driven member 60 yields at a rate which is less than the rotational rate of the drive member. Driving force is transmitted to the driven member and a speed ratio of less than 1:1 is achieved. This yielding mechanical connection is constituted by the drive balls disposed between the drive ball 56' lodged in the notch 150' and the projection 76. As the drive member 44 is rotated and the number of drive balls in this mechanical connection is progressively decreased, it is seen that the driven member 60 "loses ground" to the drive member 44.

It now remains to describe the manner in which the control ball 90 functions to regulate the rate of circulation of the drive balls 56 through channel 72 so as to determine the speed ratio between the drive member 44 and the driven member 60. Referring now to FIGURE 11, three different angular orientations of the control ball 90 are shown in A, B and C. The diagrammatic sketches of FIGURE 11 are looking down and through the control ball 90 such as in FIGURES 3 and 5.

The clearance between the spherical surface 92 of the control ball 90 and the concave surface 42 of the spool 40 is slightly less than the diameter of the drive balls 56. As a consequence, the drive balls 56 effectively bite into the working surfaces of the control ball 90 and spool 40 defining the upper and lower surfaces of the channel portion 72a, thus achieving good surface contact therewith. The achievement of this surface contact assures the proper coaction of the control ball 90 and the spool 40 on the drive balls 56.

According to an important feature of my invention, the slot 84 in the part 66 and the corresponding slot 86 in the part 68 are slightly off line from a radial line intersecting the axial center lines of the control ball 90 and the spool 40. This can be seen in FIGURE 5 wherein the slots 84 and 86 are slightly offset to the left. It will be seen from FIGURE 5 that if the driven member 60 is rotated counterclockwise, the control ball 90, as it revolves counterclockwise about the stationary spool 40, tends to roll over the drive balls 56 in the channel portion 72a. Thus, by slightly offsetting the channel portion 72a in the direction in which the control ball 90 revolves around the spool 40, the biting action of the drive balls 56 on the spherical surface 92 and the concave surface 42 is enhanced.

Now returning to FIGURE 11A, the control ball is shown angularly oriented such that its spin axis 90a is parallel to the center line 72b of the channel portion 72a. Upon rotation of the drive member 44, a force is exerted on the series of drive balls 56 attempting to push the drive balls through the channel portion 72a from right to left as seen in FIGURE 11A. Since the spin axis 90a of the control ball 90 is parallel to the line of movement of the drive balls through the channel portion 72a, the force exerted by the drive balls on the control ball 90 is incapable of rotating it about its spin axis 90a (shaft 100). Assume that the driven member 60 rotates counterclockwise in response to counterclockwise rotation of the drive member 44 as seen in FIGURE 5. The control ball 90 thus revolves in a counterclockwise direction about the stationary spool 40. It is seen that this will impart a spin to the drive balls 56 lodged in the channel portion 72; the direction of spin being normal to the center line 72b of the channel portion 72a. This direction of drive ball spin is indicated by the arrows 56a which point upward indicating the direction of movement of the upper surfaces of the drive balls confined in the channel portion 72a. It is seen that there is no component of spin of the drive balls 56 in the channel portion 72a in the direction of the center line 72b of the channel portion 72a tending to roll the drive balls therethrough from right to left. Thus, the drive balls 56 cannot pass through the channel portion 72a, and a speed ratio of 1:1 is achieved.

Turning to FIGURE 11B, the control ball 90 is shown as being angularly oriented such that its spin axis 90a is normal to the center line 72b of the channel portion 72a. As the drive balls 56 are being forced through the channel portion 72a from right to left as seen in FIGURE 11B by rotation of the drive member 44, it is seen that the drive balls will impart a spin to the drive ball 90. The drive balls 56 in the channel portion 72a, in turn, will spin in the direction indicated by the arrows 56a. Arrows 56a point to the left in FIGURE 11B to indicate the direction of movement of their upper surfaces. It is seen that the arrows 56a are aligned with the center line 72b of the channel portion 72a. Consequently, the balls roll through the channel portion 72a from right to left at the same rate as they are being brought around in channel 58 by the rotation of the drive member 44. As explained above, this produces an idle condition wherein no driving torque is communicated from the drive member 44 to the driven member 60. Since the control ball 90 does not revolve around the stationary spool 40 at idle, there would be no component of spin of the drive balls 56 introduced which is in a direction normal to the center line 72b of the channel portion 72a.

FIGURE 11C shows the angular orientation of the control ball to produce a speed ratio between 1:1 and idle. As before, rotation of the drive member 44 causes the drive balls 56 to be pushed through the channel portion 72a from right to left as seen in FIGURE 11C. As the drive balls 56 engage the spherical surface 92 of the control ball 90, the control ball will rotate about its spin axis to impart a spin to the drive balls in the channel portion 72a which is in a direction indicated by the arrows 56b. Arrow 56b, which again indicates the direction of movement of the upper surface of the drive balls 56 in the channel portion 72a, is normal to the spin axis 90a of the control ball 90. It is seen that the arrow 56b is not aligned with the center line 72b of the channel portion 72a and consequently the drive balls roll through this channel portion at a rate less than the rate that the drive balls are being brought around in channel 58 by the rotation of the drive member 44. Thus, driving force is communicated from the drive member 44 to the driven member 60 causing the latter to rotate. The control ball will thus revolve about the stationary spool 40 which tends to impart a component of spin indicated by the arrow 56c which is in a direction normal to the center line 72b of the channel portion 72a. The actual direction of spin of the drive balls 56 in the channel portion 72a thus become the resultant, indicated by the arrow 56a, of the spin components indicated by the arrows 56b and 56c. Inasmuch as the spin of the drive balls 56 in the channel portion 72a, having the direction indicated by the arrow 56a, can be resolved into a component of roll which is aligned with the center line 72b of the channel portion 72a, it is seen that the balls will roll through the channel portion 72a. This component of roll determines the rate at which the drive balls 56 circulate throughout the channel portion 72a and thus the speed ratio between drive member 44 and the driven member 60.

It is thus seen that by varying the angular orientation of the drive ball 90 relative to the channel portion 72a, any speed ratio between 1:1 and 1:0 is obtainable. The operation of the drive ball 90 and the spool 40 may be analogized to that of a worm gear engaging the drive balls 56 to move them through the channel portion 72a, wherein the pitch of the worm gear is infinitely variable.

At this point, it should be noted that the tortuous path of the drive balls 56 in channel 72 is significant in that it enables the channel portion 72a to extend in a direction parallel to the axis of central shaft 38 about which the drive and driven members rotate. Consequently, the interaction between the drive balls 56 and the control ball 90 will not give rise to a torque tending to rotate the driven member 60.

Referring to FIGURES 4 and 10, it will be seen that the governor 120, according to the disclosed embodiment of my invention, operates to achieve the proper angular orientation of the control ball 90 so as to develop a constant speed output. It will be seen that as the driven member 60 is rotated, the weights 122 and 124, affixed to the driven member, will swing outwardly against the resisting force of the spring 132 due to centrifugal force.

As the weights 122, 124 swing outwardly, the control ball 90 is angularly oriented by means of the ring gear 104 and rack gear 136 from the orientation of FIGURE 11A toward the orientation shown in FIGURE 11B. At some intermediate angular orientation, such as that shown in FIGURE 11C as determined by operation of the governor 120, the proper orientation of the control ball 90 is achieved to produce the desired constant speed output from the driven member 60. If the rotational speed of the drive member 44 varies, the governor 120 operates to readjust the angular orientation of the control ball 90 so as to maintain the output speed constant.

Figure 13:
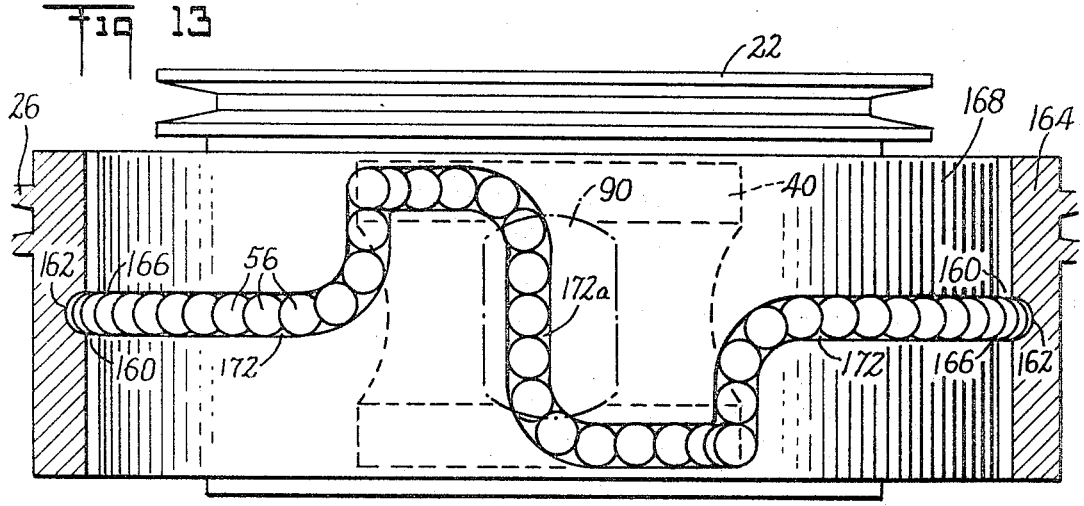
FIGURE 13 is a top plan view, partially broken away, of the drive mechanism of FIGURE 12.

A second embodiment of my invention is shown in FIGURES 12 and 13. The differences between this embodiment and the embodiment disclosed in FIGURES 1 through 10 are in the manner in which the drive balls 56 are urged into circulation by rotation of the drive member 44 and in the manner in which driving force is communicated from the drive member to the driven member 60 by way of the drive balls.

As seen in FIGURES 12 and 13, a channel 160, corresponding to the channel 58 in the embodiment of FIGURES 1 through 10, is formed in part by cutting an annular groove 162 in the inner surface of a drive member 164 which, in this embodiment, takes the form of an annular ring. The remainder of the channel 160 is formed by cutting a groove 166 cut in the peripheral surface of a driven member 168. As best seen in FIGURE 12, the annular groove 166 in the driven member 168 extends along a major portion of the circumference of the driven member from point 169 to 170. Between points 169 and 170 the ends of the channel 160 are connected together by a second channel 172 which corresponds to the channel 72 in the embodiment of FIGURES 1 through 10. Channel 172 serves to convey the drive balls 56 to and from the channel 160. While in channel 172 the drive balls are coacted upon the control ball 90 and the spool 40 communicating with channel portion 172a in precisely the same manner as described in the first embodiment.

The principal difference between the embodiment of FIGURES 12 and 13, and the embodiment of FIGURES 1 through 10 is that the drive balls 56 while in channel 160 are in continuous contact with both the drive member 164 and the driven member 168. Thus, the drive balls 56 in the channel 160 effectively serve as a ball race journalling the drive and driven members for relative rotation. Thus, the drive member 164 is not journaled to the shaft of the central spool as in the first embodiment of my invention.

The operation of the control ball 90 and spool 40 to regulate the rate of circulation of the drive balls through channel 172 is precisely as described in connection with FIGURE 11. If the control ball 90 is oriented as in FIGURE 11A to preclude circulation of the drive balls therethrough, it is seen that the drive balls retain their positions relative to the drive member 164 and the driven member 168. As a consequence, driving force is communicated from the drive member 164 to the driven member 168 through each of the drive balls in the channel 160. This is due to the fact that each drive ball 56 in the channel 160 formed by opposed grooves 162 and 166 is in continuous surface contact with both the drive member 164 and the driven member 168. Consequently, a 1:1 speed ratio is achieved between the drive member 164 and the driven member 168.

In the situation where the drive ball is oriented as shown in FIGURE 11B, an idle condition is similarly achieved in the embodiment of FIGURES 12 and 13. It is seen that in this condition, the drive balls will roll in the channel 160 by virtue of the fact that they engage both the drive member 164 and the driven member 168. The surface speed of the rolling drive balls 56 in the channel 160 is equal to the surface speed of the groove 162 carried by the rotating drive member 164 and the drive balls will circulate around to the entrance of channel 172 at a rate equal to one-half of their surface speed by virtue of their spherical configuration. Since the drive balls may pass through the channel 172 as fast as they arrive from channel 160, the driven member 168 does not rotate.

Finally considering the condition where the drive ball 90 in FIGURES 12 and 13 is oriented as shown in FIGURE 11C, it is seen that by decreasing the rate of circulation of the drive balls 56 in channel 172, the rate at which they can roll in channel 160 is decreased proportionately. With each increment of roll of the drive balls 56 in channel 160, the driven member 168 loses ground to the drive member 164. Consequently, a speed ratio of less than 1:1 is obtained.

It will be appreciated that in the embodiment of FIGURES 12 and 13, a drive pulley may be affixed to the drive member 164 and an output pulley affixed to the driven member 168. The spool 40 is fixed against rotation as in the previously described embodiment.

SUMMARY

It is thus seen that I have disclosed a mechanical drive mechanism which is capable of providing an infinitely variable speed ratio between the drive and driven members. This is accomplished in a novel manner by employing opposing surfaces to variably coact on a plurality of drive balls 56 circulating in a closed-loop path. The rate of circulation of the drive balls as regulated by the character of the coaction developed by these opposing surfaces determines the speed ratio between the drive and driven members. Thus, the opposing surfaces which are carried by the control ball 90 and the spool 40 act effectively as a variable metering valve to control the rate at which the drive balls are circulated.

It will be appreciated that there may be provided a greater number of notches 150 in channel 58 carried by the driven member 44 than the four shown in FIGURE 7. In fact, there may be provided notches 150 for each drive ball 56 accommodated in the channel 58. Although not necessary, it has been found desirable to provide additional projections in advance of the projections 74 and 76 seen in FIGURE 7 to lift the drive balls from the notches 150 before reaching the projection 74, 76 guiding the drive balls out of channel 58 and into channel 72. This eliminates undue wear on the drive balls otherwise encountered if the projections 74, 76 must lift the drive balls from the notches 150 as well as guide them into the channel 72. Moreover, it is deemed desirable for operation at high angular velocities to remove a portion of the metal in part 68 of the driven member 60 such as by drilling one or more holes in order to balance out the driven member.

It will be understood that, by virtue of the off-centering of the channel portions 72a and 172a relative to the control ball 90 and spool 40, the disclosed drive mechanism is more efficient when rotated in one direction than in the other. With some loss in efficiency, these channel portions could be centered and thus render the drive mechanism bi-directional. It is found, however, that the off-centering of these channel portions not only enhances the biting action between the drive balls, the control balls, and the spool, but also eliminates any frictional engagement between the drive balls and the sides of these channel portions as defined by the sides of slots 84 and 86 (FIGURE 5).

It should be additionally noted that the geometrical configurations of the control ball 90 and the spool 40 need not be as specifically shown in the drawings. For example, the working surface of the control ball could be concave rather than spherical and the working surface of the spool would thus be spherical rather than concave.

It may occur to those skilled in the art that the disclosed drive mechanism can be operated in a variety of different ways. As disclosed, the central shaft 30 is held stationary; the member 44 is driven and the output is taken from the member 60. If the member 60 is held stationary and the central shaft 38 driven, the output can be taken off the pulley 22 affixed to the member 44. In this application, the control can be oriented so as to provide forward and reverse as well as idle with the central shaft always being rotated in one direction. Alternatively, the member 60 may be driven and the output taken from the member 44 with the central shaft 38 fixed. This is simply the reversal of the situation disclosed in the drawings. In this application, the speed ratio is infinitely variable from 1:0 to 1:1 when the member 60 is driven in one direction. With the same angular orientations of the control ball 90 and the member 60 driven in the opposite direction, speed ratios greater than 1:1 are achieved. This can be seen from the fact that in the first instance the drive balls circulate through the channel 72 carried by the member 60 (now the drive member) in a direction opposite to the direction of rotation of the members 60 and 44. In the second instance, the drive balls circulate through the channel 72 in the same direction the members 60 and 44 rotate. Thus, as each drive ball is introduced into the channel 58 from the channel 72, the member 44 which carries the channel 58 must advance ahead of the member 60 in order to accommodate the introduction of each drive ball.

It will also be seen that the member 44 can be fixed; the member 60 driven, and the output taken from the central shaft 38.

It will be readily appreciated that the disclosed mechanical drive mechanism is not limited to a constant speed drive application. The orientation of the control speed drive application can be adjusted manually or automatically for the purpose of developing a desired speed output. Variations in the control ball orientation then provide for a correspondingly variable speed output. Thus, it is seen that the principles of my invention are particularly applicable to transmissions.

In the various aspects of my invention considered above, the rotation of the control ball is not utilized other than for its effect on the drive balls and the spool 40. However, it will be appreciated by means of a suitable gearing arrangement, drive can be imparted to or taken directly from the control ball 90.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A mechanical drive mechanism comprising, in combination:
    (A) a drive member;
    (B) a driven member;
    (C) means forming a closed-loop channel in portions of said drive and driven members;
    (D) a plurality of individual drive balls disposed in said channel,
        (1) said drive balls tending to circulate through a portion of said channel due to the movement of said drive member, and
        (2) said drive balls operable to transmit driving force from said drive member to said driven member;
    (E) control means in communication with said portion of said channel for determining the rate of circulation of said drive balls therethrough, (1) the rate of circulation of said drive balls being inversely proportional to the speed ratio established between said drive and driven members.

2. The mechanical drive mechanism defined in claim 1 wherein said drive member and said driven member are rotary members.

3. The mechanical drive mechanism defined in claim 1 wherein said control means is adjustable to vary the speed ratio between said drive and driven members.

4. The mechanical drive mechanism defined in claim 1 wherein said drive balls circulate serially through said channel portion.

5. The mechanical drive mechanism defined in claim 4 wherein said channel portion is formed in and carried by said driven member.

6. The mechanical drive mechanism defined in claim 5 wherein said control means is mounted in said driven member.

7. The mechanical drive mechanism defined in claim 6 wherein said control means comprises
 (1) a control ball rotatable about a first axis,
  (a) said control ball adjustably mounted in said driven member for varying angular orientation about a second axis perpendicular to said first axis,
 (2) a spool fixedly mounted against rotation and disposed in a central bore in said driven member,
 (3) said spool and said control ball coacting on said drive balls in said channel portion to impart a spin thereto about a spin axis angularly orientated relative to said channel portion,
  (a) the angular orientation of said spin axis relative to said channel portion determining the rate at which said drive balls roll through said channel portion.

8. The mechanical drive mechanism defined in claim 7 which further includes
 (F) means operating to vary the angular orientation of said control ball about said second axis.

9. The mechanical drive mechanism defined in claim 8 wherein
 (1) said operating means is a governor affixed to said driven member,
  (a) said governor operating to maintain the speed of said driven member constant.

10. A mechanical drive mechanism comprising, in combination:
 (A) a drive member;
 (B) a driven member;
 (C) first and second channel portions connected end to end to form a continuous, closed-loop channel;
 (D) a plurality of individual drive balls disposed in said channel, said drive balls
  (1) being urged to circulate through said first channel portion by movement of said drive member, and
  (2) operable to transmit driving force from said drive member to said driven member; and
 (E) control means communicating with said first channel portion,
  (1) said control means operating to adjustably determine the rate of circulation of said drive balls through said first channel portion,
  (2) the circulation of said drive balls through said first channel portion establishing a speed ratio between said drive and driven members inversely proportional to the rate of circulation.

11. The mechanical drive mechanism defined in claim 10 wherein said control means includes:
 (1) a control ball mounted for rotation about a first axis and for angular orientation about a second axis normal to said first axis,
 (2) a spool centrally located relative to said drive and driven members,
  (a) said spool being constrained from rotation,
 (3) said spool and said control ball coacting on at least one drive ball in said first channel portion to impart spin thereto,
  (a) the direction of spin relative to said first channel portion determining the rate at which said one drive ball will roll therethrough.

12. The mechanical drive mechanism defined in claim 11 wherein,
 (a) said control ball includes a spherical surface disposed in said first channel portion,
 (b) said spool includes a concave surface geometrically complementing said spherical surface of said control ball,
  (i) said concave surface disposed in said first channel portion oppositely from said spherical surface to define a passageway in said first channel portion,
 (c) the clearance between said spherical surface of said control ball and the concave surface of said spool being slightly less than the diameter of said drive balls,
 (d) whereby said drive balls in said passageway bite into said spherical surface and said concave surface.

13. The mechanical drive mechanism defined in claim 12 wherein
 (e) said drive balls pass through said passageway in a direction transverse to the direction of movement of said drive and driven members.

14. The mechanical drive mechanism defined in claim 13 wherein
 (f) said passageway is slightly offset from said second axis in the direction of movement of said drive member.

15. The mechanical drive mechanism defined in claim 10 wherein
 (1) said first channel portion is formed in and carried by said driven member, and
 (2) said second channel portion is formed in and carried by said drive member.

16. The mechanical drive mechanism defined in claim 15 wherein
 (3) said second channel portion includes means forming at least one notch in said second channel portion,
 (4) whereby a drive ball is lodged in said notch causing said drive balls in said second channel portion to revolve in synchronism with rotation of said drive member.

17. The mechanical drive mechanism defined in claim 16 wherein
 (a) said second channel portion is provided by an annular surface groove formed in said drive member, and
 (b) a pair of projections carried by said driven member and disposed in said annular groove adjacent the ends of said first and second channel portions,
  (i) said projections operating to guide said drive balls revolved in said second channel portion into said first channel portion for circulation therethrough and back into said second channel portion.

18. The mechanical drive mechanism defined in claim 17 which further includes
 (F) a central shaft,
  (1) said drive member and said driven member journaled on said shaft for rotation thereabout.

19. The mechanical drive mechanism defined in claim 10 wherein
 (1) said second channel portion is provided by opposed grooves formed in contiguous surfaces of said drive and driven members,
  (a) said drive member being journaled for movement relative to said driven member by the drive balls disposed in said second channel portion, and
 (2) said first channel portion is formed in and carried by said driven member.

20. A mechanical drive mechanism comprising, in combination
(A) a central shaft fixedly mounted against rotation;
(B) a drive member journaled on said shaft for rotation thereabout;
(C) a driven member journaled on said shaft for rotation thereabout;
(D) means forming a first channel in said driven member;
(E) means forming an annular groove in said drive member;
(F) a pair of projections carried by said driven member adjacent each end of said first channel and disposed in said annular groove,
  (1) said projections defining the ends of a second channel formed by an arcuate portion of said annular groove and a surface of said driven member,
  (2) said projections serving to connect said first and second channels end to end in a closed-loop;
(G) a plurality of drive balls disposed in said first and second channels,
  (1) said drive balls being revolved in said second channel upon rotation of said drive member and urged to circulate through said first channel,
  (2) said projections serving to guide said drive balls into and out of said first and second channels, and
  (3) said drive balls operable to transmit driving force from said drive member to said driven member; and
(H) control means for adjustably regulating the rate of circulation of said drive balls through said first channel,
  (1) the rate of circulation of said drive balls through said first channel being inversely proportional to the speed ratio established between said drive and driven members.

21. The mechanical drive mechanism defined in claim 20 which further includes
(I) means forming notches in said annular groove,
  (1) whereby upon rotation of said drive member a drive ball is lodged in at least one of said grooves to force said drive balls in said second channel to revolve in synchronism with the rotation of said drive member.

22. The mechanical drive mechanism defined in claim 20 wherein
(1) said drive member is formed in two parts and fastened together at an interface,
(2) said first channel being defined by a surface groove formed in the surface of one of said parts at the interface therebetween.

23. The mechanical drive mechanism defined in claim 20 wherein
(1) a portion of said first channel runs in a direction parallel to said central shaft, and
(2) said control means being disposed in communication with said portion of said first channel.

24. The mechanical drive mechanism defined in claim 23 wherein said control means includes
(1) a control ball,
(2) a mounting ring for mounting said control ball for rotation about a first axis,
  (a) said mounting ring rotatably mounted in said driven member for rotation about a second axis normal to said first axis,
(3) a spool fixedly mounted concentrically on said central shaft,
(4) said spool and said control ball coacting on the drive balls in said first channel portion to impart spin thereto,
  (a) the direction of spin of said drive balls relative to said first channel portion determining the rate at which said drive balls roll therethrough.

25. The mechanical drive mechanism defined in claim 24 wherein
(a) said control ball having a spherical surface disposed in said first channel portion to engage said drive balls,
(b) said spool having a concave surface portion geometrically complementing said spherical surface of said control ball,
  (i) said concave surface disposed in said first channel portion to engage said drive balls,
(c) said drive balls pass through said first channel portion between said spherical surface of said control ball and said concave surface of said spool.

26. The mechanical drive mechanism defined in claim 25 which further comprises
(J) a governor operated to maintain the rotational speed of said driven member constant, said governor including
  (1) a ring gear fixedly attached to said mounting ring,
  (2) a rack gear engaging said ring gear,
    (a) said rack gear mounted for reciprocal movement in said driven member,
  (3) at least one weight pivotally connected to said driving means,
    (a) said weight adapted to pivot in response to the centrifugal force developed by the rotation of said driven member, and
  (4) mechanical linkage interconnecting said weight and said rack gear
    (a) whereby pivotal movement of said weight is effective to annularly orient said drive ball about said second axis.

27. The mechanical drive mechanism comprising, in combination:
(A) a first member;
(B) a second member;
(C) a third member;
(D) a closed-loop channel;
(E) a plurality of balls disposed in said channel,
  (1) said balls being urged to circulate in said channel;
(F) a first annular surface disposed in a portion of said channel, said first annular surface,
  (1) mounted by said first member for rotation about its central axis and for adjustable angular orientation about a second axis normal to said central axis;
(G) a second annular surface disposed in said channel portion opposing said first annular surface, said second annular surface,
  (1) mounted by said second member,
  (2) said first and second annular surfaces coacting on the drive balls in said channel portion so as to regulate the rate of circulation of balls therethrough according to the angular orientation of said first annular surface about said second axis;
(H) whereby with one of said members held stationary, drive is transmitted between the other two of said members with the speed ratio being determined according to the rate of circulation fo said balls.

28. The mechanical drive mechanism defined in claim 27 wherein said second member is held stationary, and said first member is driven by said third member.

29. The mechanical drive mechanism defined in claim 27 wherein said first member is held stationary, and drive is transmitted from said second member to said third member.

30. The mechanical drive mechanism defined in claim 27 wherein said second member is held stationary, and drive is transmitter from said first member to said third member.

31. The mechanical drive mechanism defined in claim 27 wherein said third member is held stationary, and drive is transmitted from said first member to said second member.

32. The mechanical drive mechanism defined in claim 27 wherein said first member is held stationary, and drive is transmitted from said third member to said second member.

33. The mechanical drive mechanism defined in claim 27 wherein said third member is held stationary, and drive is transmitted from said second member to said first member.

No references cited.

FRED C. MATTERN, Jr., *Primary Examiner.*

C. J. HUSAR, *Assistant Examiner.*